Nov. 25, 1969     V. DEVÉ     3,480,265

SHELL SAND TREATING APPARATUS AND METHOD

Filed Jan. 4, 1968     3 Sheets-Sheet 1

INVENTOR
Vagn DEVÉ
BY
Pierre Lespérance
PATENT AGENT

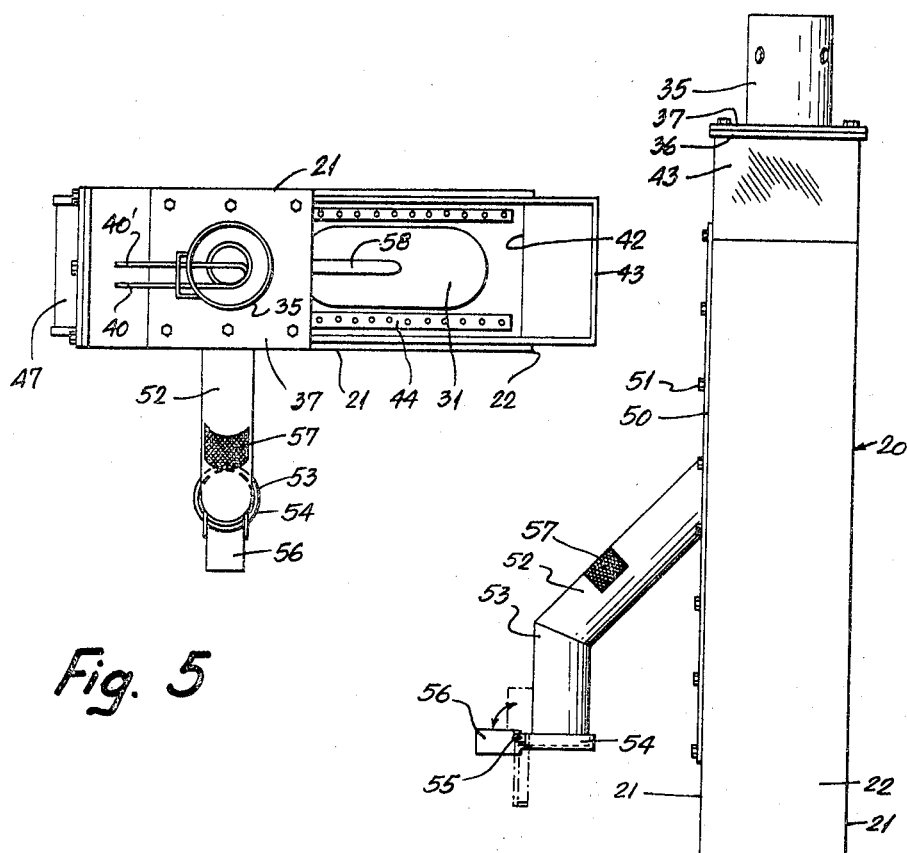

United States Patent Office 3,480,265
Patented Nov. 25, 1969

3,480,265
SHELL SAND TREATING APPARATUS AND METHOD
Vagn Devé, 3025 Sherbrooke St., Montreal, Quebec, Canada
Filed Jan. 4, 1968, Ser. No. 696,008
Int. Cl. F27b *15/00, 15/16*
U.S. Cl. 263—21    11 Claims

ABSTRACT OF THE DISCLOSURE

This invention relates to a method and apparatus for changing the temperature of granular material such as sand used in shell molding and other applications, and in which the material is fluidized in a vessel, which is bottom-fed with gas under pressure and the fluidized material is contacted with a stationary heat exchange surface located in the vessel.

The method and apparatus are used for reclaiming shell sand by heating the sand above the burning off temperature of the resin and other residues or impurities. The method and apparatus are also used for cooling sand down to a resin coating temperature.

---

The present invention relates to a method and apparatus for treating material such as sand for use in shell molding and other applications and has more particular reference to a method and means for reclaiming used shell sand. Used shell sand is foundry sand, coated with a resin material which is partially, or completely, carbonized. This sand consists of a mixture of fines and of lumps of different sizes, such as broken shell mold pieces. All the resin and other impurities must be removed from the sand in order to be able to recoat the same with resin.

Different apparatuses for reclaiming shell sand are already known. They are all based on the principle of heating the sand to a temperature above the burning off temperature of the cured resin, in order to oxidize the same and remove it as combustion gases.

In a class of known apparatuses, the sand is heated while being mechanically displaced either in a rotary kiln furnace or in a multiple hearth furnace having rotating rabble arms or in other types of furnaces with rotating or other kinds of moving parts.

Sand reclamation has also been attempted in a vertical incinerator furnace in which layers of broken shell mold parts alternate with layers of fine sand. Reclamation has also been effected in a dry scrubbing apparatus, in which the sand grains are directed by compressed air on an impact target.

In all these known methods and apparatuses, it is either very difficult to control the reclaiming operation resulting in variable quality of the reclaimed sand, or the used sand must be processed through a hammer mill, or other device, in order to reduce the lumps of sand to a fine granular material before treatment. Also, the various apparatuses used are very expensive, necessitate refractory lining and require frequent servicing. In all known methods and apparatuses, it has been found impossible to heat the sand rapidly to a uniform high temperature for burning off the coated resin due to the fact that the sand and resin are very poor heat conductors. Therefore, a higher temperature than the resin burning temperature must be attained and, consequently, the vessel must be lined with refractory material.

It is an object of the present invention to provide a method and apparatus which obviate the above-mentioned disadvantages and which is characterized by fluidizing the sand and heating the same to a temperature above the burning off temperature of the cured resin and continuing fluidization of the sand and heating of the same until the resin is completely burnt off, this method being very fast and efficient inasmuch as all the sand particles very rapidly attain the minimum burning off temperature due to convectional currents setting up in the fluidized sand and, therefore, all the sand particles quickly come in contact with the heat exchange surfaces.

Another object of the present invention resides in the provision of an apparatus and method of the character described, in which the sand to be reclaimed need not be subjected to any previous comminuting operation, as the sand lumps very quickly break down in the fluidized bed.

Another object of the present invention resides in the provision of an apparatus and method of the character described, which, due to the fact that the sand is maintained in fluidized condition and that, therefore, air and consequently oxygen surrounds practically every sand particle, there is very quick burning off of the cured resin.

Another object of the present invention resides in the provision of reclaiming shell sand process and apparatus of the character described, in which the sand, due to the above-noted features, need not be heated to a temperature of more than 1100° F. in order to obtain very pure reclaimed sand and, consequently, the apparatus of the invention does not require any refractory lining. The apparatus, furthermore, has no movable part and is therefore very inexpensive to build and requires little servicing. The heater does not subject the sand to high local heat while passing through a flame, nor does it subject the sand to high velocity flue gas carrying away fines.

Another object of the present invention resides in the provision of an apparatus and a method of the character described, in which the sand may be cooled down from a high temperature to a temperature, say, suitable for use for resin coating by means of the same fluidized bed process. Here again no movable parts are needed and the sand temperature is very rapidly brought down to the desired extent.

Another object of the present invention resides in an apparatus of the character described, in which the sand is heated by electric immersion heaters or by a piping circuit located in the vessel and fed with hot combustion gases. Similarly, the same apparatus can be used for cooling down the sand by using the same piping for circulating a cooling liquid such as water.

The foregoing and other important objects of the present invention will become more apparent during the following disclosure and by referring to the drawings, in which:

FIGURE 5 is a top plan view of the apparatus of FIGURE 4; and

FIGURE 6 is an end elevation of the apparatus of FIGURE 4.

In the drawings, like reference characters indicate like elements throughout.

Figure 1:
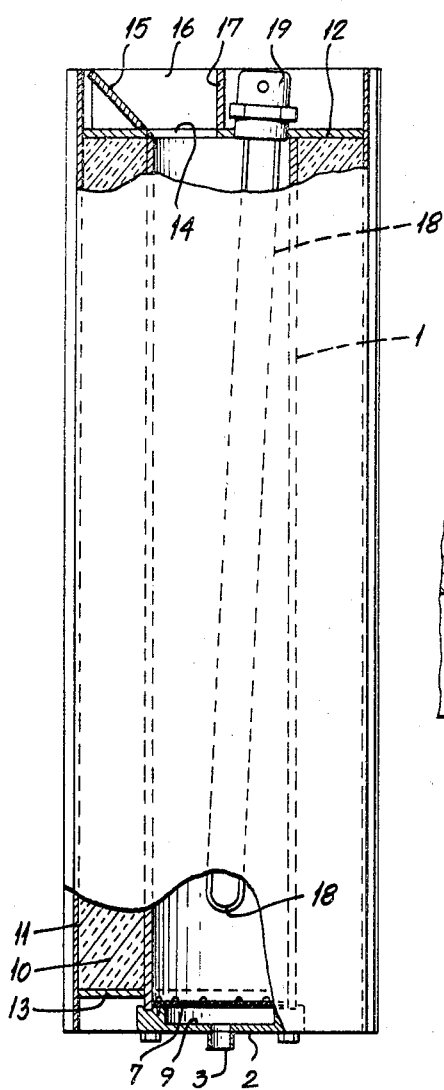
FIGURE 1 is an elevation, partially in longitudinal section, of a shell sand reclaiming apparatus in accordance with a first embodiment of the invention.
Figure 2:
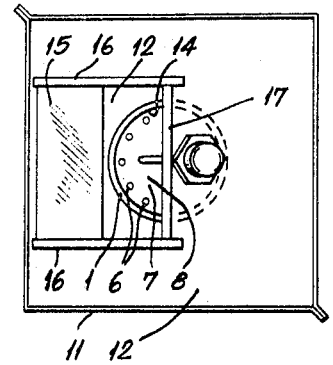
FIGURE 2 is a top plan view of the apparatus of FIGURE 1.
Figure 3:
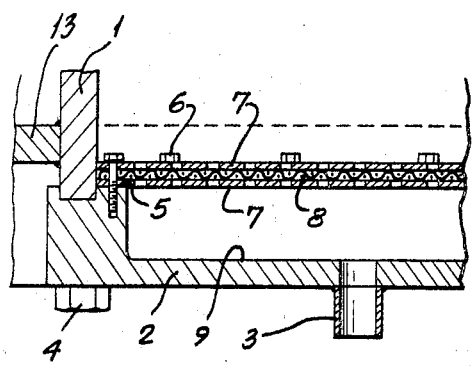
FIGURE 3 is a partial cross-section of the bottom part of the apparatus, on an enlarged scale.

Referring to FIGURE 1, there is shown an experimental vessel, of elongated shape, and disposed in upright position. This vessel consists of a cylindrical body 1 made of steel resistant to high temperature and is closed at its bottom end by a cap 2 provided at its centre with a nipple 3 communicating with the inside of the vessel and adapted to be connected to a hose or suitable tubing connected to a supply of air under pressure. Cap 2 is tightly secured to the end of cylindrical body 1 by means, for example, of bolts 4 screwed in the end of body 1.

The cap 2 forms, inwardly of the body 1, an annular shoulder 5, on which is secured by bolts 6 an assembly consisting of a pair of perforated plates 7 with the interposition of a fine mesh screen 8.

The openings of plates 7 are distributed evenly over the entire surfaces of said plates and the screen 8 has a mesh size such as to return the fine sand particles thereon, so as to prevent the sand from entering the bottom compartment 9 defined between cap 2 and the plate and screen assembly 7 and 8.

The cylindrical body 1 is surrounded over its entire length by a relatively thick layer of heat insulating material 10, itself held in position by an outer jacket 11 surrounding the heat insulating material and secured to the inner vessel 1 at the top and bottom end thereof by plates 12 and 13.

The bottom plate 13 is welded to the body 1 and jacket 11 at a position slightly spaced above cap 2. The top plate 12 is welded to the top edge of body 1 and to the inside of jacket 11, the same protruding above the top plate 12. Said top plate 12 has a semi-circular loading opening 14 co-extensive with half the open end of body 1.

An inclined baffle plate 15 is secured to the top of plate 12 and to two upright spaced parallel plates 16 disposed on the sides of loading opening 14 and joined at their other ends by a transverse upright plate 17, secured also to the straight transverse side of loading opening 14. Plates 15, 16, 17 define a loading funnel.

An electric immersion heater element 18 is located within the vessel 1 and the holding head 19 of said element 18 is inserted within a hole made in the top plate 13 behind the transverse plate 17.

The element 18 may have a U-shape and may extend practically down to the perforated plate and screen assembly 7-8 at a slight angle with respect to the axis of body 1.

This experimental vessel is used as follows:

Spent shell sand, such as zircon or silica sand, coated with cured partially carbonized resin is loaded into the vessel 1, 2. The mixture may include lumps of sand such as broken shell molds of different sizes consistent with the size of the loading opening 14.

Compressed air of a few pounds pressure is fed to the nipple 3 and the electric heating element 18 is connected to an electric supply. The sand fines become fluidized and the sand lumps float in the fluidized sand fines. The heat developed by the element 18 causes convection currents to be produced in the sand due to its fluidized condiiton and the lumps quickly become desaggregated and the body of said is brought to a temperature of 1100° Fahrenheit. It will be noted that fluidized sand behaves as a liquid, or other fluid, and fast convection currents are produced in the mass of sand. Air moving through the sand and escaping through the loading opening 14, serves as a supply of oxygen for the rapid burning of the resin. After a few minutes at about 1100° F., the apparatus is closed down and the sand is discharged by either turning the vessel upside down or by removing the cap 2 by unscrewing bolts 4. The reclaimed sand has a consistent white color, is completely pure sand and in granular free flowing state. Thus, the sand is completely suitable for re-use in the resin coating process.

Figure 4:
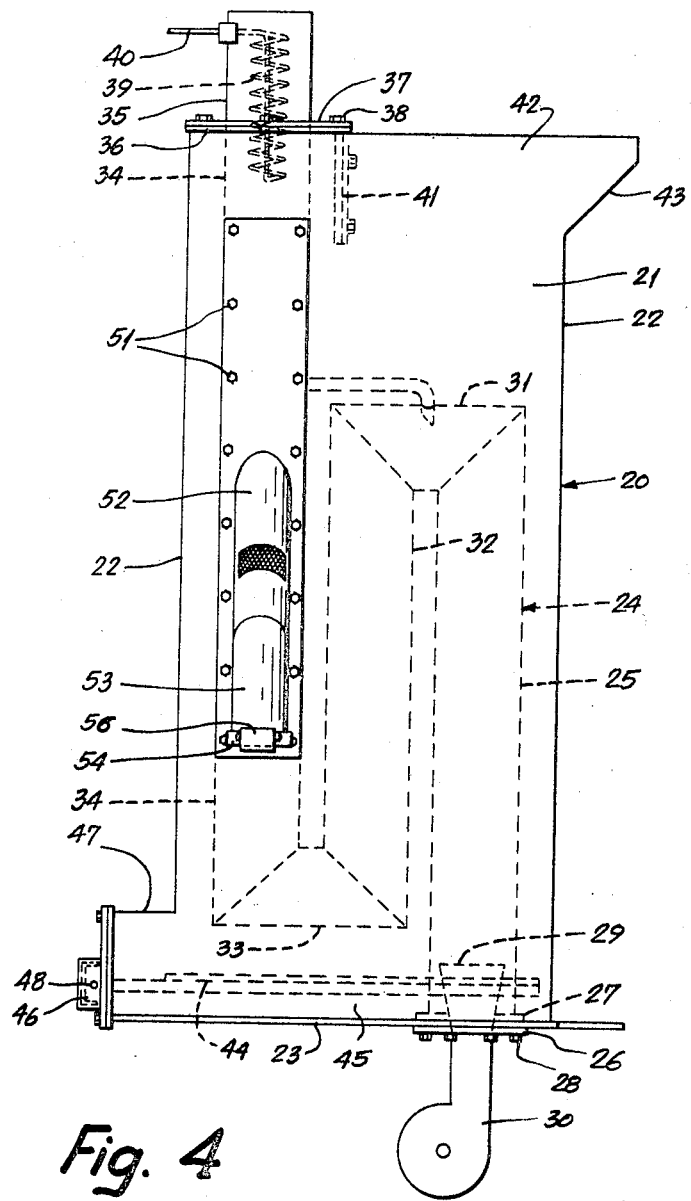
FIGURE 4 is a side elevation of a second embodiment of the apparatus.

FIGURES 4 to 6 show an apparatus using hot combustion gases as a source of heat. This apparatus comprises a vessel 20, made of steel resistant to high temperature, having a generally rectangular shape when seen in cross-section, said vessel comprising main side walls 21, terminal side walls 22 and a closure bottom plate 23.

A heat exchanging tube or duct 24 is located within the vessel 20. Said tube is bent at two spaced portions at 180°. The tube 24 comprises a riser portion 25 having its lower end secured to the bottom closure plate 23 by means of a fastening ring 26 bolted to the outside of bottom plate 23 and to the end flange 27 of riser tube 24, by means of bolts 28.

The bottom plate 23 has a hole for receiving the outlet 29 of a fuel oil burner 30, which could be replaced by a gas burner, if so desired.

Heat exchange tube 24 has a U bent 31 in communication with the top of the riser portion 25 and connecting with a down portion 32, itself connected to a U bent 33, in turn connected to a second riser portion 34, which extends vertically in the vessel 20 and protrudes from the upper end thereof, as shown at 35.

The second riser portion 34 extends through an opening made in a top plate 36 secured to the top of vessel 20 and is maintained in position by a fastening ring 37 surrounding the riser 34 and secured to the plate 36 by bolts 38.

An air pre-heating spiral coil 39 is disposed within the protruding portion 35 of the riser 34 and the inlet 40' and outlet 40 of the coil extend laterally of the protruding portion 35.

Top plate 36 closes just one small portion of the top open end of vessel 20 and joins at its inner transverse edge with a downwardly extending baffle plate 41 extending across the width of the vessel.

Baffle 41 extends just a small distance downwardly in the vessel and defines one side of a sand loading opening 42 in the vessel.

The terminal wall 22 of the vessel opposite riser 34 is outwardly upwardly inclined, as shown at 43, to facilitate loading of the sand.

The vessel 20 is provided just above its bottom plate 23 with an assembly 44 of a fine mesh screen between two perforated plates similar to the assembly 7–8 described in the first embodiment. The assembly 44 extends across the entire bottom of the vessel 20 so as to define between the same and the bottom plate 23 a chamber 45 in communication with box 46 of the outside of a bottom laterally protruding portion 47 of the vessel.

This box 46 has a nipple 48 connected by suitable piping (not shown) to the outlet 40 of the pre-heating coil 39, the inlet 40' of said heating coil being connected to a suitable source of air under pressure.

One of the main side walls 21 of the vessel 20 is provided with a vertically extending elongated access opening disposed opposite the riser portion 34 of the heat exchange tube 23, said lateral opening being closed by a plate 50 by means of bolts 51.

A downwardly discharge tube 52 is secured to plate 50 around a hole made therein to be in communication with the inside of the vessel 20. This discharge tube 52 has an outer downwardly vertically extending outer portion 53 freely open at its end.

A cup-shaped closure 54 is adapted to freely surround the open end of discharge tube 52. Said closure 54 is pivoted at 55 and is normally maintained in closed position, for instance by means of a counterweight 56.

The inclined portion of discharge tube 52 is provided on its top surface with an opening covered by a screen 57. The screen has a fine mesh size so as to prevent passage of the sand particles therethrough.

Preferably, a conduit 58 connects the top of the U bend 31 with the second riser portion 34 of the tube 24.

The apparatus in accordance with the second embodiment is operated as follows:

Clean or reclaimed sand is loaded into vessel 20 up to the upper end of discharge tube 52, this clean sand filling said discharge tube but retained therein by cup-shaped closure 54 in closed position.

The fuel oil burner 30 is started whereby hot combustion gases flow through the zig-zag heat exchange tube 24 and to a chimney connected to the protruding portion 35 of the riser 34. Meanwhile, air under pressure is supplied first to the coil 39 to preheat this air and then into the bottom compartment, or chamber 45, and the preheated air issues through the perforations and the screen of the assembly 44, so as to be evenly distributed, and to fluidize the sand in the vessel.

After the clean or reclaimed sand has been brought to a temperature above the burning off temperature of the impurities to be eliminated in used sand, for instance, to about 1100° F., sand to be reclaimed including broken shell molds and other lumps of shell sand, are loaded into the vessel through loading opening 42. The fine particles of the used sand become quickly fluidized while the lumps of sand are completely surrounded by the fine particle sands. The whole mass, being fluidized, is subjected to convection current as in a fluid. Thus, the sand is uniformly heated by contact with the hot tube 24 and the lumps quickly break down into separate particles.

The temperature of the sand is brought to about 1100° F. and, therefore, all the cured and partly carbonized resin in the sand is quickly burnt off and the resulting gases escape together with the air under pressure through the loading opening of the vessel.

After a few minutes of this treatment, closure 54 is open; the sand is discharged under gravity through discharge tube 52 and, during this discharge, the air entrained with the sand issues through the screened opening 57. When no more sand is discharged, closure 54 is again closed and a fresh load of sand to be treated is loaded into the vessel. Thus, about one-third of the total capacity of the vessel remains filled with reclaimed sand at all times so as to facilitate the treatment of the fresh load of sand.

It is obvious that heat exchange tube 24 could be fed with hot gases furnished by any fuel, such as fuel oil or gas.

Upon closing down of the apparatus, tube 58 will serve to allow escape of any combustion gases remaining in the heat exchange tube 24.

It is obvious that the heat exchange tube 24 could be fed with circulating cold water. Thus, hot treated sand discharged from vessel 20 can be quickly cooled in a second similar, but water cooled, apparatus down to a temperature suitable for coating the sand particles with resin.

What I claim is:

1. A method for reclaiming shell sand, comprising fluidizing a certain portion of reclaimed sand in a vessel bottom-fed with gas under pressure, heating said reclaimed sand to a temperature above the burning off temperature of impurities to be eliminated in used sand, adding used sand to the already fluidized and hot reclaimed sand and allowing the used sand to attain said temperature, keeping the fluidized mixture of used and reclaimed sand at said temperature to allow removal of said impurities by burning off and discharging fully reclaimed sand from said vessel.

2. A method as claimed in claim 1, wherein discharging of fully reclaimed sand is effected on the upper layer of the sand in said vessel.

3. An apparatus for treating granular material such as sand, of the type used in foundry work and other applications, comprising an elongated vessel adapted to be positioned upright, said vessel having a top loading opening and a bottom including a pair of perforated plates having perforations throughout their surfaces, a fine mesh screen interposed between said pair of perforated plates, said fine mesh screen having a mesh smaller than the particles to be treated, said vessel defining a chamber under said assembly of perforated plates and screen, said chamber adapted to be connected to a supply of gas under pressure, a heat exchange element located in said vessel and consisting of a zigzag duct extending through the bottom of said vessel at one end, said one end adapted to be fed with hot combustion gases, the other end of said zigzag duct protruding from the top end of said vessel.

4. An apparatus as claimed in claim 3, further including an air pre-heating coil disposed within said zigzag tube and connected directly to a source of air under pressure, the outlet of said coil connected to said chamber.

5. An apparatus for treating granular material such as sand, of the type used in foundry work and other applications, comprising an elongated vessel adapted to be positioned upright, said vessel having a top loading opening and a perforated bottom, the perforations of said bottom being adapted for connection to a supply of gas under pressure, a heat exchange element located in said vessel and a discharge tube opening into said vessel at the side thereof and at a level above said bottom, said discharge tube carrying a pivoted cup-shaped closure freely surrounding the open end thereof in the closed position of said closure, said discharge tube having an inclined portion provided with a screened opening disposed above said cup-shaped closure.

6. An apparatus for treating granular material such as sand, of the type used in foundry work and other applications, comprising an elongated vessel adapted to be positioned upright, said vessel having a top loading opening and a perforated bottom, means for supplying gas under pressure to said perforations, a heat exchange element extending through said vessel, said heat exchange element comprising a duct entering said vessel at a first point and exiting at another point, and means for feeding combustion gases into said duct at said first point.

7. An apparatus as claimed in claim 6, wherein said duct has a zigzag shape and said first point is the bottom of said vessel and said another point is the top end of said vessel.

8. An apparatus as claimed in claim 6, wherein said bottom comprises a pair of perforated plates having perforations throughout their surfaces, a fine mesh screen interposed between said pair of perforated plates, said fine mesh screen having a mesh size smaller than the particles to be treated, said vessel defining a chamber under the assembly of perforated plates and screen, said means for supplying gas under pressure being connected to said chamber.

9. An apparatus as claimed in claim 8, wherein said duct has a zigzag shape and said first point is the bottom of said vessel, while said another point is the top end of said vessel.

10. An apparatus as claimed in claim 9, wherein said means for supplying gas under pressure includes a gas line having a portion disposed within said zigzag duct for preheating the gas supplied to said perforations.

11. An apparatus as claimed in claim 6, further including a discharge tube in communication with the side of said vessel at a level above the bottom of the latter, said discharge tube downwardly extending and having a lower open end, a pivoted cup-shaped closure freely surrounding said open end in the closed position of said closure, said discharge tube having an inclined portion provided with a screened opening disposed above said cup-shaped closure.

References Cited

UNITED STATES PATENTS

| | | | |
|---|---|---|---|
| 2,530,651 | 11/1950 | Christensen | 263—21 |
| 2,782,019 | 2/1957 | Turney et al. | |
| 2,797,908 | 7/1957 | Zubrzycki. | |
| 2,931,711 | 4/1960 | Walker | 165—104 X |
| 3,196,251 | 7/1965 | Bruyne | 165—104 X |
| 3,242,974 | 3/1966 | Goulounes. | |

JOHN J. CAMBY, Primary Examiner

U.S. Cl. X.R.

34—57; 165—104